(12) United States Patent
Shimobayashi et al.

(10) Patent No.: US 12,358,429 B2
(45) Date of Patent: Jul. 15, 2025

(54) DRIVER ASSISTANCE DEVICE AND DRIVER ASSISTANCE SYSTEM INCLUDING DRIVER ASSISTANCE DEVICE

(71) Applicant: TOYOTA JIDOSHA KABUSHIKI KAISHA, Toyota (JP)

(72) Inventors: Noriyuki Shimobayashi, Toyota (JP); Naoki Horikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/475,612

(22) Filed: Sep. 27, 2023

(65) Prior Publication Data

US 2024/0239264 A1 Jul. 18, 2024

(30) Foreign Application Priority Data

Jan. 18, 2023 (JP) .................. 2023-005784

(51) Int. Cl.
*B60Q 9/00* (2006.01)
(52) U.S. Cl.
CPC ..................... *B60Q 9/00* (2013.01)
(58) Field of Classification Search
CPC .......... B60Q 9/00; B60W 50/14; B60W 50/16
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 10,821,893 B1* | 11/2020 | Assam | G08G 1/096783 |
| 2006/0217860 A1* | 9/2006 | Ihara | B62D 15/025 701/41 |
| 2014/0257640 A1* | 9/2014 | Mitsumoto | B60W 40/101 701/41 |
| 2015/0138361 A1* | 5/2015 | Tatsukawa | B60W 30/00 348/148 |
| 2016/0207454 A1* | 7/2016 | Cuddihy | G08B 6/00 |
| 2017/0148327 A1* | 5/2017 | Sim | G08G 1/167 |
| 2018/0170255 A1* | 6/2018 | Hashimoto | B60Q 5/005 |
| 2022/0013014 A1* | 1/2022 | Xu | G01C 21/3691 |

FOREIGN PATENT DOCUMENTS

JP 2010-167932 A 8/2010

\* cited by examiner

*Primary Examiner* — Omer S Khan
(74) *Attorney, Agent, or Firm* — SoraIP, Inc.

(57) ABSTRACT

Based on image information captured by a camera sensor, a deviation degree determination unit determines the degree of deviation when a situation occurs in which a vehicle V deviates from its lane. Vibration pattern information according to the degree of deviation is transmitted to the wearable device, and a vibration device contained in the wearable device is vibrated according to the vibration pattern information. As a result, the vibration device can be vibrated in a vibration pattern according to the degree of deviation from the lane without making the driver feel annoyed and making passengers feel uncomfortable.

8 Claims, 4 Drawing Sheets

DRIVER ASSISTANCE DEVICE AND DRIVER ASSISTANCE SYSTEM INCLUDING DRIVER ASSISTANCE DEVICE

CROSS-REFERENCE TO RELATED APPLICATION

This application claims priority to Japanese Patent Application No. 2023-005784 filed on Jan. 18, 2023, incorporated herein by reference in its entirety.

BACKGROUND

1. Technical Field

The present disclosure relates to driver assistance devices and driver assistance systems including the driver assistance device. More particularly, the present disclosure relates to an improvement in notifying a driver when a situation occurs in which a traveling vehicle deviates from its lane (traveling lane).

2. Description of Related Art

Conventionally, a driver assistance device is known that, when a situation occurs in which a traveling vehicle deviates from its lane, emits an alarm sound to a driver or causes a vibration device contained in a steering wheel to vibrate in order to notify the driver of the situation (see, for example, Japanese Unexamined Patent Application Publication No. 2010-167932 (JP 2010-167932 A)). This notification from the driver assistance device (notification by the alarm sound or the vibration) allows the driver to recognize that the situation has occurred in which the vehicle deviates from its lane. When the driver performs a steering operation to eliminate the deviation, the vehicle can be controlled to travel within the lane.

SUMMARY

However, when a notification is given by an alarm sound, the driver may feel annoyed by the alarm sound or passengers may feel uncomfortable. Therefore, a notification using an alarm sound cannot be said to be preferable as a means of notification.

When a notification is given by vibration of the steering wheel, it is difficult for the driver to distinguish whether the vibration of the steering wheel is vibration of the vibration device (vibration for notifying deviation from the lane) or vibration generated in the steering wheel due to an uneven road surface (hereinafter referred to as "uneven road surface vibration"). Accordingly, it has not been possible to ensure that the driver is properly notified that the situation has occurred in which the vehicle deviates from its lane.

Considering that there is uneven road surface vibration, it is difficult to make the vibration pattern of the vibration device contained in the steering wheel complex (e.g., change the vibration pattern according to the degree of deviation from the lane). Accordingly, there was no choice but to use simple vibration patterns (e.g., only one vibration pattern that makes it easy to distinguish from uneven road surface vibration). There is also a concern that the vibration of the steering wheel may make it difficult for the driver to perform a steering operation.

The present disclosure was made in view of the above circumferences, and it is an object of the present disclosure to provide a driver assistance device and a driver assistance system including the driver assistance device that can properly notify the driver of the state of deviation of a vehicle from its lane without making the driver feel annoyed or making passengers feel uncomfortable.

A solution of the present disclosure to achieve the above object is based on a driver assistance device configured to notify a driver when a situation occurs in which a traveling vehicle deviates from a lane. The driver assistance device is characterized by including: a deviation degree determination unit configured to determine a degree of deviation when the situation occurs in which the vehicle deviates from the lane; and an information transmission unit configured to send, to a wearable device worn by the driver of the vehicle, information for causing a vibration device contained in the wearable device to vibrate in a pattern (vibration pattern) according to the degree of deviation.

Based on this matter specifying the disclosure, the deviation degree determination unit determines the degree of deviation (magnitude of deviation from the lane, etc.) when the situation occurs in which the traveling vehicle deviates from the lane. The information transmission unit sends, to the wearable device worn by the driver of the vehicle, the information for causing the vibration device contained in the wearable device to vibrate in the pattern according to the degree of deviation. As a result, the vibration device of the wearable device vibrates in the pattern according to the degree of deviation. The driver can therefore accurately recognize the degree of deviation from the lane by feeling the vibration pattern of the vibration device.

As described above, in the related art in which an alarm sound is used to notify that the vehicle has deviated from the lane, the driver may feel annoyed or passengers may feel uncomfortable. In this solution, since the wearable device worn by the driver vibrates (vibration device contained in the wearable device vibrates), the driver is less likely to feel annoyed and passengers are less likely to feel uncomfortable.

As described above, in the related art in which vibration of the steering wheel is used to notify that the vehicle has deviated from the lane, it is difficult for the driver to distinguish whether the vibration of the steering wheel is vibration of the vibration device contained in the steering wheel or uneven road surface vibration. In this solution, since the wearable device worn by the driver vibrates, it is possible to reduce a negative influence due to uneven road surface vibration (negative influence on recognition that the vehicle has deviated from its lane). As a result, it is possible to ensure that the driver is properly notified that the situation has occurred in which the vehicle deviates from its lane. Since the negative influence due to uneven road surface vibration can be reduced, it is possible to make the vibration pattern of the vibration device contained in the wearable device complex. In other words, the vibration device of the wearable device is caused to vibrate in a specific vibration pattern according to the degree of deviation determined by the deviation degree determination unit out of a plurality of types of vibration patterns according to the degrees of deviation from the lane. This allows the driver to accurately recognize the degree of deviation.

The driver assistance device may further include a vibration pattern information generation unit configured to generate vibration pattern information according to the degree of deviation determined by the deviation degree determination unit. The information transmission unit may be configured to send the vibration pattern information to the wearable device as the information for causing the vibration device to vibrate in the pattern according to the degree of deviation.

According to this configuration, in the wearable device having received the vibration pattern information from the information transmission unit, the vibration device vibrates in the pattern according to the degree of deviation from the lane, based on the vibration pattern information. Therefore, the wearable device need not store in advance information on a plurality of types of vibration patterns according to the degrees of deviation from the lane. As a result, it is possible to simplify the configuration of the wearable device and reduce the load on the wearable device.

A driver assistance system including the above driver assistance device is also within the scope of the technical idea of the present disclosure. In other words, the solution of the present disclosure is based on a driver assistance system including a driver assistance device configured to notify a driver when a situation occurs in which a traveling vehicle deviates from a lane. This driver assistance system is characterized in that the driver assistance device includes a deviation degree determination unit configured to determine a degree of deviation when the situation occurs in which the vehicle deviates from the lane, and an information transmission unit configured to send, to a wearable device worn by the driver of the vehicle, information for causing a vibration device contained in the wearable device to vibrate in a pattern according to the degree of deviation. This driver assistance system is also characterized in that the wearable device contains the vibration device and includes a vibration control unit configured to cause the vibration device to vibrate in the pattern according to the information received from the information transmission unit.

Based on this matter specifying the disclosure as well, the vibration device in the wearable device vibrates in the pattern according to the degree of deviation from the lane. The driver can therefore accurately recognize the degree of deviation from the lane by feeling the vibration pattern of the vibration device. As described above, the driver is less likely to feel annoyed and the passengers are less likely to feel uncomfortable. Moreover, as described above, it is possible to ensure that the driver is properly notified that the situation has occurred in which the vehicle deviates from the lane. The vibration device of the wearable device vibrates in a specific vibration pattern according to the degree of deviation determined by the deviation degree determination unit out of a plurality of types of vibration patterns according to the degrees of deviation. This allows the driver to accurately recognize the degree of deviation.

The driver assistance device may further include a vibration pattern information generation unit configured to generate vibration pattern information according to the degree of deviation determined by the deviation degree determination unit. The vibration control unit may be configured to cause the vibration device to vibrate in the pattern according to the vibration pattern information received from the information transmission unit.

Therefore, as described above, the wearable device need not store in advance a plurality of types of vibration pattern information according to the degrees of deviation from the lane. As a result, it is possible to simplify the configuration of the wearable device and reduce the load on the wearable device.

Specifically, the wearable device may be a device worn on an arm of the driver.

In this case, the driver can easily wear the wearable device. The driver can also easily feel the vibration of the vibration device of the wearable device, and therefore can accurately recognize the degree of deviation from the lane.

In the present disclosure, the vibration device contained in the wearable device is caused to vibrate in the pattern according to the degree of deviation when the situation occurs in which the vehicle deviates from its lane. Therefore, the driver does not feel annoyed, and passengers do not feel uncomfortable. The vibration device of the wearable device is caused to vibrate in a specific vibration pattern according to the degree of deviation determined by the deviation degree determination unit out of a plurality of types of vibration patterns according to the degrees of deviation from the lane. This allows the driver to accurately recognize the degree of deviation.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. This embodiment will explain a case where a wristwatch-type wearable device that is worn on the wrist of the driver is employed as the wearable device.

Figure 1:
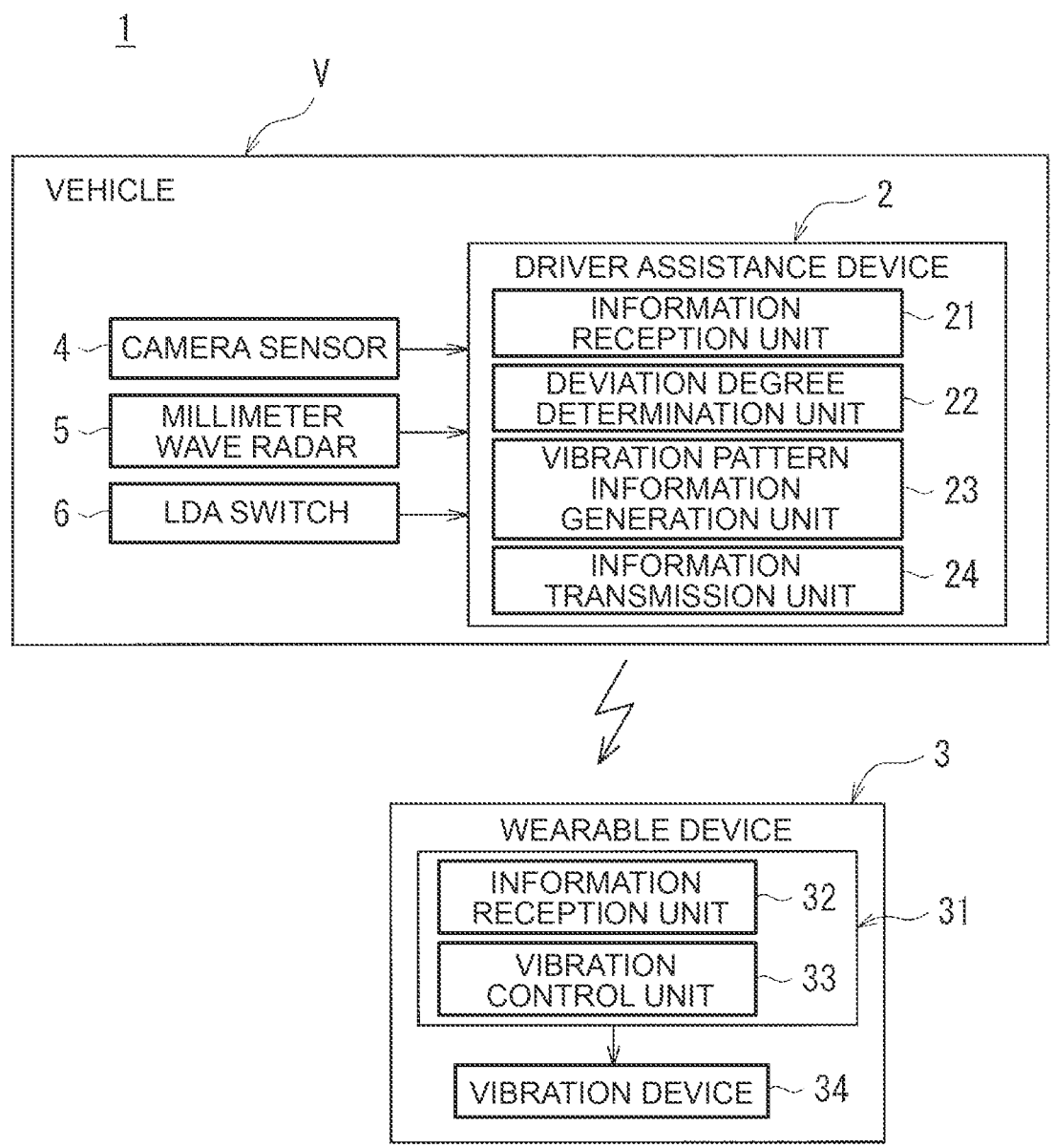
FIG. 1 is a block diagram showing a schematic configuration of a driver assistance system.

FIG. 1 is a block diagram showing a schematic configuration of a driver assistance system 1 according to this embodiment. As shown in FIG. 1, the driver assistance system 1 is configured such that a driver assistance device 2 mounted on a vehicle V and a wearable device (a wearable device worn on the wrist of a driver) 3 can transmit and receive signals. For example, well-known Bluetooth (registered trademark) or the like is used as communication means between the driver assistance device 2 and the wearable device 3.

Driver Assistance Device

A vehicle V is equipped with a driver assistance device 2, a camera sensor 4, a millimeter wave radar 5, a Lane Departure Alert (LDA) switch 6, and the like.

The driver assistance device 2 includes a processor such as a Central Processing Unit (CPU), a Read-Only Memory (ROM) that stores control programs, a Random-Access Memory (RAM) that temporarily stores data, an input/output port, and the like. The driver assistance device 2 includes an information reception unit 21, a deviation degree determination unit 22, a vibration pattern information generation unit 23, and an information transmission unit 24 as functional units implemented by the control program. An outline of the functions of each of the above units will be described below.

In the driver assistance device 2, the information reception unit 21 is connected (wired connection) to each of the camera sensor 4, the millimeter wave radar 5, and the LDA switch 6 by a signal line, so that signals can be transmitted and received between the camera sensor 4, the millimeter wave radar 5, and the LDA switch 6 through an in-vehicle network based on a communication protocol such as a controller area network (CAN) or Ethernet.

The camera sensor 4 is mounted, for example, in the front grille of the vehicle V, and captures an image of an area extending downward toward the front of the vehicle within a predetermined angular range. The area photographed by the camera sensor 4 is a relatively wide-angle area so as to include the white line of the road in a position relatively close to the vehicle V in front of the vehicle (self-vehicle) V.

The white line of the road mentioned here includes a center line (so-called center line), a lane boundary line (for example, a strip-shaped white line provided between a driving lane and an overtaking lane on a road with two or more lanes on each side), a road outside line (a strip-shaped white line provided near the shoulder on the side where the sidewalk is provided), and a roadside strip (a strip-shaped white line provided on the side of the road where the sidewalk is not provided). It is a white line that is recognized in order to determine whether the vehicle is in a driving state in which the vehicle V may deviate from the lane or in which the vehicle V is deviating from the lane (hereinafter, these states may be referred to as situations in which the vehicle V deviates from the lane), when a tire of the vehicle V is in a state in which the tire approaches or is in contact with the white line.

The camera sensor 4 uses a photoelectric conversion element such as a Complementary Metal Oxide Semiconductor (CMOS) or a Charge Coupled Device (CCD) to output image data with a predetermined brightness gradation to the driver assistance device 2 at predetermined cycle times.

The millimeter wave radar 5 is installed in a front grill in front of the vehicle, in a bumper in the rear of the vehicle, or the like. The millimeter wave radar 5 detects obstacles in front of the vehicle V including obliquely in front (hereinafter simply referred to as front) and in the rear including obliquely behind the vehicle V (hereinafter simply referred to as rear). The millimeter-wave radar 5 detects the presence of obstacles by transmitting radar with a predetermined wavelength among millimeter-wave (30 GHz to 300 GHz) wavelengths and receiving millimeter waves reflected from surrounding obstacles. In addition to the determination of deviation from the lane using the camera sensor 4 described above, the millimeter wave radar 5 may be used to detect a roadside sidewalk etc. to detect that a tire of the vehicle V is close to the sidewalk etc., and it may be determined based on this detection result that the vehicle V is in the vehicle traveling state in which the vehicle V may deviate from the lane or in the vehicle traveling state in which the vehicle V has deviated from the lane (the vehicle V is in the situation in which the vehicle V deviates from the lane).

The LDA switch 6 is installed around the driver's seat so that the ON/OFF operation by the driver is possible. When the LDA switch 6 is ON, a driver assistance operation (operation of notifying the driver when a situation occurs in which the vehicle V deviates from the lane) is performed. When the LDA switch 6 is OFF, the driver assistance operation is not performed.

The deviation degree determination unit 22 performs image processing on the image data output from the camera sensor 4 every predetermined cycle time. The deviation degree determination unit 22 determines whether a situation in which the vehicle V deviates from the lane has occurred by detecting the relative position of the white line on the road on the image with respect to the vehicle V. When the situation in which the vehicle V deviates from the lane has occurred, the deviation degree determination unit 22 determines the degree of deviation.

The deviation degree determination unit 22 searches upward from the bottom of the frame for regions having brightness equal to or higher than a predetermined threshold, for example, based on the brightness of the acquired image data. Since the white line has edges, which are high-frequency components, at both ends, when the luminance value of the frame is differentiated in the horizontal direction, peaks are obtained at both ends of the white line, so that the white line portion can be estimated. For the estimated white line portion, the deviation degree determination unit 22 extracts the white line based on a threshold value determined from the brightness and contrast with the road surface, a threshold value for the width of the white line, and the like, and recognizes the white line by applying a method such as matching from characteristics such as linear shape. Then, the deviation degree determination unit 22 determines whether a situation in which the vehicle V deviates from the lane has occurred based on the recognized white line. When the situation in which the vehicle V deviates from the lane has occurred, the deviation degree determination unit 22 determines the degree of deviation. Information on the degree of deviation is output from the deviation degree determination unit 22 to the vibration pattern information generation unit 23. Note that the technique for recognizing the white line is not limited to the one described above.

The patterns of the degree of deviation determined (determined) by the deviation degree determination unit 22 will be described below. The deviation degree determination unit 22 is adapted to determine four patterns of a vehicle traveling state in which the vehicle V may deviate from the lane or a vehicle traveling state in which the vehicle V deviates from the lane.

Figure 2:
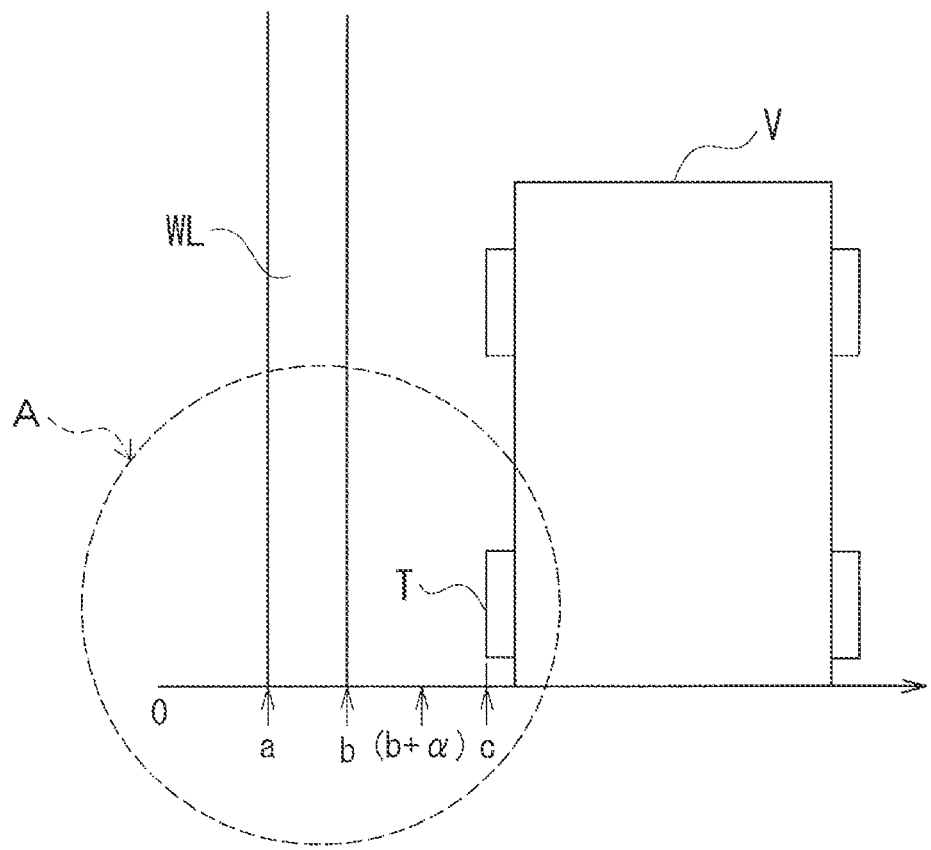
FIG. 2 is a schematic diagram showing a white line and a vehicle in a situation where the vehicle does not deviate from the lane.

FIG. 2 is a schematic diagram showing the white line WL and the vehicle V in a situation in which the vehicle V does not deviate from the lane. FIG. 2 shows a state in which the vehicle V is traveling on the lane with a sufficient distance from the white line WL. In terms of coordinates on the horizontal axis (horizontal direction perpendicular to the traveling direction of the vehicle V), the distance from the origin 0 is defined as the coordinate position of the outer edge of the white line WL (edge far from the lane) is a, the coordinate position of the inner edge of the white line WL (edge adjacent to the lane) is b, and the coordinate position of the tire T on the vehicle V near the white line WL is c. FIG. 2 shows a state in which the coordinate position c of the tire T is positioned farther than a position (coordinate position of b+α) at a predetermined distance α from the coordinate position b. In this state, it is determined that it is not the situation in which the vehicle V deviates from the lane, and the deviation degree determination unit 22 outputs information indicating that the vehicle V is not deviating from the lane.

Figure 3A:
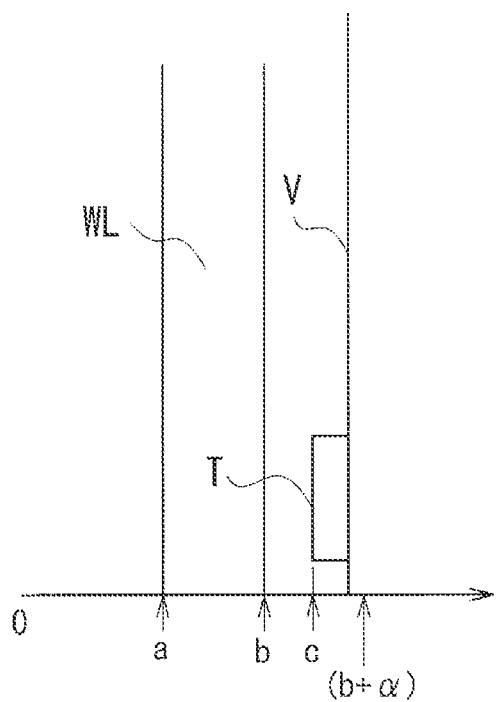
FIG. 3A is a schematic diagram showing a white line and a part of the vehicle in each of the vehicle traveling state in which the vehicle may deviate from the lane or the vehicle traveling state in which the vehicle deviates from the lane, and is a diagram showing the vehicle traveling state of a first pattern.
Figure 3B:
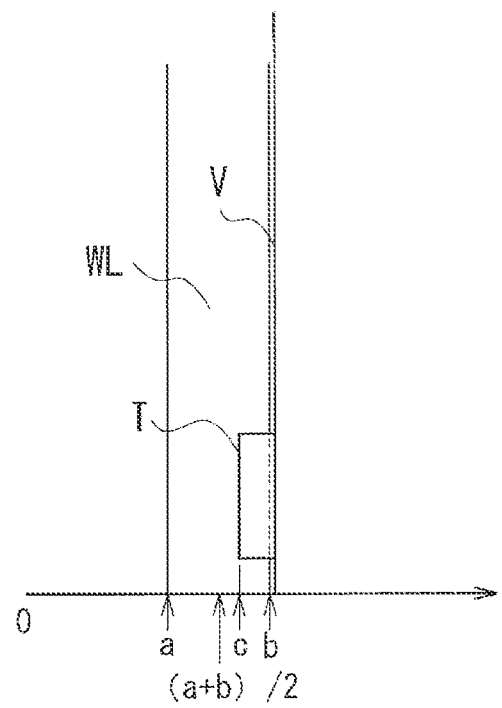
FIG. 3B is a schematic diagram showing a white line and a part of the vehicle in each of the vehicle traveling state in which the vehicle may deviate from the lane or the vehicle traveling state in which the vehicle deviates from the lane, and is a diagram showing the vehicle traveling state of a second pattern.
Figure 3C:
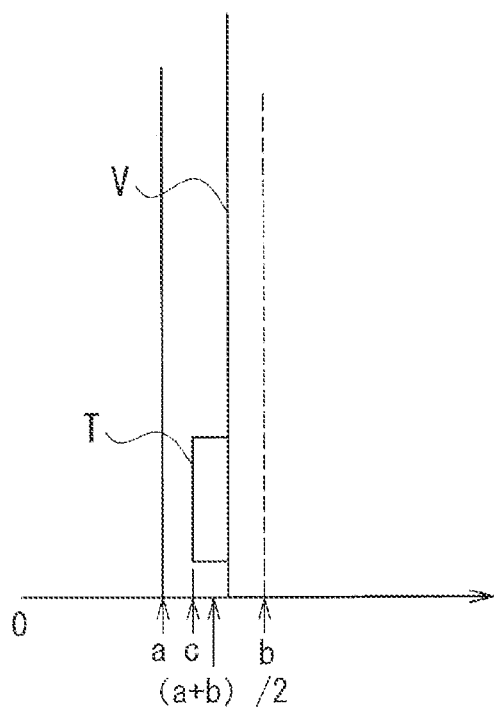
FIG. 3C is a schematic diagram showing a white line and part of the vehicle in each of a vehicle traveling state in which the vehicle may deviate from the lane or a vehicle traveling state in which the vehicle deviates from the lane, and is a diagram showing a vehicle traveling state of a third pattern.
Figure 3D:
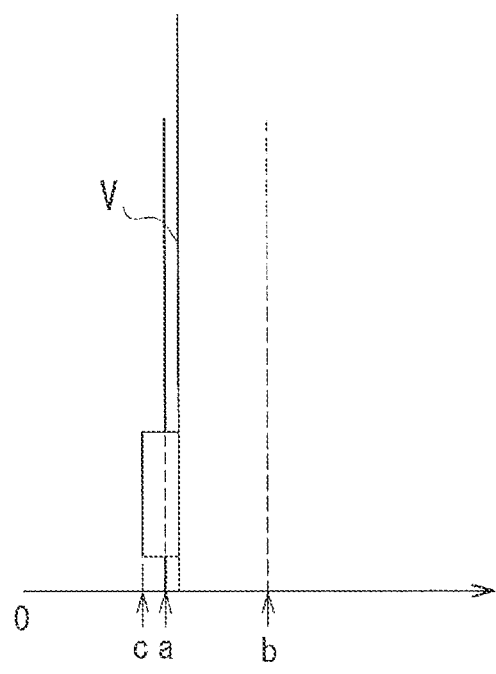
FIG. 3D is a schematic diagram showing a white line and a part of the vehicle in each of a vehicle traveling state in which the vehicle may deviate from the lane or a vehicle traveling state in which the vehicle has deviated from the lane, and is a diagram showing a vehicle traveling state of a fourth pattern.

FIGS. 3A to 3D are schematic diagrams showing part of the white line WL and the vehicle V in each of vehicle traveling states in which the vehicle V may deviate from the lane or in which the vehicle V deviates from the lane. FIGS. 3A to 3D are enlarged views of the region A enclosed by the dashed line in FIG. 2. FIG. 3A is a diagram showing the vehicle traveling state of the first pattern. FIG. 3B is a diagram showing the vehicle traveling state of the second pattern. FIG. 3C is a diagram showing the vehicle traveling state of the third pattern. FIG. 3D is a diagram showing the vehicle traveling state of the fourth pattern.

In the vehicle traveling state of the first pattern shown in FIG. 3A, the coordinate position c of the tire T is closer to the coordinate position b than the coordinate position (b+α) (state of b<c≤b+α). α can be set to any value. For example, it is set to 100 mm. This value is not limited to this.

The vehicle traveling state of the second pattern shown in FIG. 3B is a state in which the degree of deviation is greater than that of the vehicle traveling state of the first pattern. The vehicle traveling state of the second pattern shown in FIG. 3B is a state where the coordinate position c of the tire T is between the coordinate position b and the coordinate position (a+b)/2 (state of (a+b)/2<c≤b).

The vehicle traveling state of the third pattern shown in FIG. 3C is a state in which the degree of deviation is greater than that of the vehicle traveling state of the second pattern. The vehicle traveling state of the third pattern shown in FIG. 3C is a state where the coordinate position c of the tire T is between the coordinate position a and the coordinate position (a+b)/2 (state of a<c≤(a+b)/2).

The vehicle traveling state of the fourth pattern shown in FIG. 3D is a state in which the degree of deviation is greater than that of the vehicle traveling state of the third pattern. The vehicle traveling state of the fourth pattern shown in FIG. 3D is a state where the coordinate position c of the tire T reaches the deviation direction side (left side in the drawing) from the coordinate position a (state of c≤a).

When the deviation degree determination unit 22 determines that the vehicle is traveling in one of the first to fourth patterns described above, the deviation degree determination unit 22 outputs information on the determination result (information on the degree of deviation) to the vibration pattern information generation unit 23.

In FIGS. 3A to 3D, the case where the vehicle V deviates from the lane to the left has been described as an example. Likewise, when the vehicle V deviates from the lane to the right, the degree of deviation is determined by the deviation degree determination unit 22, and information on the determination result (information on the degree of deviation) is output to the vibration pattern information generation unit 23.

The vibration pattern information generation unit 23 generates vibration pattern information according to the information on the degree of deviation received from the deviation degree determination unit 22. This vibration pattern information is information for defining the vibration pattern of the vibration device 34 (see FIG. 1) contained in the wearable device 3. The vibration pattern information is individually generated according to each of the vehicle traveling states of the first to fourth patterns described above. This vibration pattern information is generated as information defining, for example, the wavelength, interval, amplitude, etc. of vibration. The parameters that define the vibration pattern are not limited to these.

The vibration pattern information includes, for example, shortening the wavelength of vibration, shortening the interval of vibration in the case of intermittent vibration, and increasing the amplitude of vibration from the first pattern with the smallest degree of deviation to the fourth pattern with the largest degree of deviation. Although each vibration pattern is not limited to this, it is preferable that the vibration pattern is a vibration pattern that makes the driver recognize that the degree of urgency is gradually increasing from the first pattern to the fourth pattern. The vibration pattern information generated by the vibration pattern information generation unit 23 is output to the information transmission unit 24.

The information transmission unit 24 transmits the vibration pattern information output from the vibration pattern information generation unit 23 toward the wearable device 3.

Wearable Device

The wearable device 3 has a configuration including a control unit 31 and a vibration device 34. This wearable device 3 may be a device dedicated to the driver assistance system 1. In other words, the wearable device 3 may be configured as a dedicated device for performing a driver assistance operation, which will be described later, or may be a versatile wristwatch-type wearable device (so-called smart watch) installed with application software for performing the driver assistance operation.

The control unit 31 includes a processor such as a CPU, a ROM that stores control programs, a RAM that temporarily stores data, an input/output port, and the like. The control unit 31 includes an information reception unit 32 and a vibration control unit 33 as functional units realized by the control program. An outline of the functions of each of the above units will be described below.

The information reception unit 32 receives the vibration pattern information transmitted from the information transmission unit 24 of the driver assistance device 2 and outputs this vibration pattern information to the vibration control unit 33.

The vibration control unit 33 controls vibration of the vibration device 34. That is, the vibration control unit 33 controls the vibration device 34 so that the vibration device 34 vibrates in a pattern according to the vibration pattern information received from the information transmission unit 24. As a result, the vibration device 34 vibrates in a pattern according to the degree of deviation determined by the deviation degree determination unit 22 out of the vehicle traveling states of the first to fourth patterns. As the configuration of the vibration device 34, a well-known unbalanced mass type, electrodynamic type, or the like can be adopted.

Driver Assistance Operation

Figure 4:
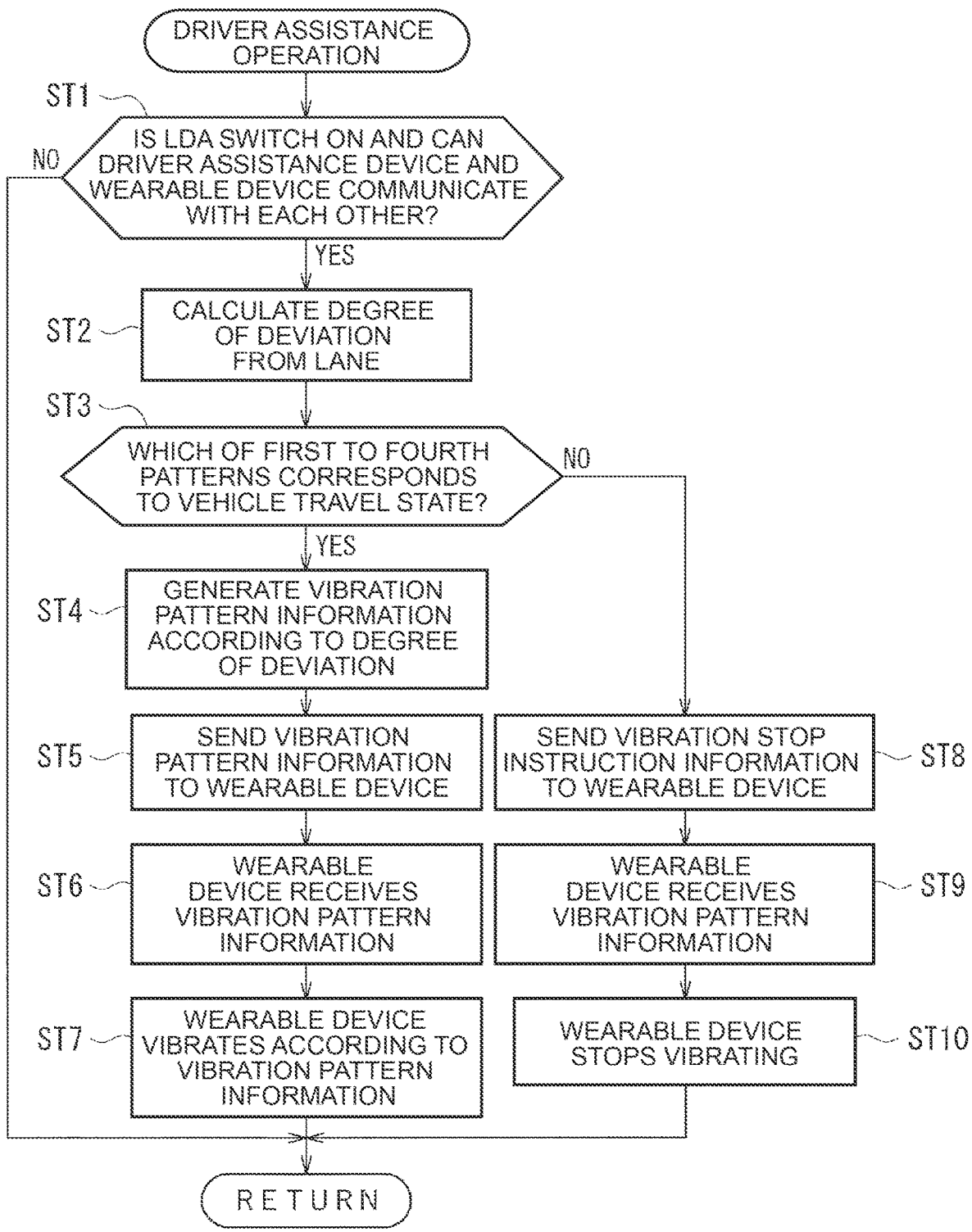
FIG. 4 is a flowchart chart showing the procedure of the driver assistance operation in the driver assistance system.

Next, the driver assistance operation performed in the driver assistance system 1 configured as described above will be described along the flowchart of FIG. 4. This flowchart is repeated at predetermined time intervals while the vehicle V is traveling.

First, in ST1, it is determined whether or not the LDA switch 6 is turned ON and the driver assistance device 2 and the wearable device 3 are in a state of being able to communicate with each other. For example, when the driver assistance device 2 receives an ON signal from the LDA switch 6 and it is confirmed that a pairing signal has been transmitted and received between the driver assistance device 2 and the wearable device 3 (when Bluetooth is used), ST1 makes a YES determination.

When the LDA switch 6 is turned off or if communication between the driver assistance device 2 and the wearable device 3 is disabled, a NO determination is made in ST1 and the process returns.

If the LDA switch 6 is turned ON, the driver assistance device 2 and the wearable device 3 are ready for communication, and if the determination in ST1 is YES, the process proceeds to ST2. In ST2, the degree of deviation from the lane in the current vehicle traveling state is calculated. This calculation is performed by the aforementioned deviation degree determination unit 22 performing image processing on the image data output from the camera sensor 4 at predetermined cycle times, and detecting the relative position of the white line WL of the road on the image.

In ST3, it is determined whether the degree of deviation from the lane calculated in ST2 corresponds to any one of the vehicle traveling states of the first to fourth patterns described above.

If the degree of deviation from the lane corresponds to any one of the vehicle traveling states of the first to fourth patterns described above, a YES determination is made in ST3, and the process proceeds to ST4. In ST4, the vibration pattern information generation unit 23 generates vibration pattern information according to the pattern of the current vehicle traveling state (according to the degree of deviation).

In ST5, the generated vibration pattern information is transmitted from the driver assistance device 2 to the wearable device 3. Then, in ST6, the wearable device 3 receives this vibration pattern information.

Then, in ST7, according to the received vibration pattern information, the vibration device 34 of the wearable device 3 vibrates in a pattern according to the current vehicle traveling state (degree of deviation).

In such a vibration state of the vibration device 34, when the degree of deviation from the lane does not correspond to any of the vehicle traveling states of the first to fourth patterns in the next routine, a NO determination is made in ST3, and the process proceeds to ST8.

In ST8, vibration stop instruction information is transmitted from the driver assistance device 2 to the wearable device 3 in accordance with the output of information indicating that there is no deviation from the lane from the deviation degree determination unit 22. Then, in ST9, the wearable device 3 receives this vibration stop instruction information. As a result, in ST10, the vibration of the vibration device 34 of the wearable device 3 is stopped according to the received vibration stop instruction information.

While the vehicle V is traveling, the above operations are repeated.

Advantageous Effect of Embodiment

As described above, in this embodiment, the vibration device 34 of the wearable device 3 vibrates in a pattern according to the degree of deviation from the lane. As a result, the driver can accurately recognize the degree of deviation from the lane by sensing the vibration pattern of the vibration device 34. In the related art in which an alarm sound is used to notify that the vehicle V has deviated from the lane, the driver may feel annoyed or passengers may feel uncomfortable. In this embodiment, the wearable device 3 worn by the driver vibrates (vibration device 34 contained in the wearable device 3 vibrates), so that the driver is less likely to feel annoyed and passengers are less likely to feel uncomfortable. In the related art in which vibration of the steering wheel is used to notify the driver that the vehicle V has deviated the lane, it is difficult for the driver to determine whether the vibration of the steering wheel is vibration of the vibration device contained in the steering wheel or uneven road surface vibration. In the present embodiment, since the wearable device 3 worn by the driver vibrates, it is possible to reduce a negative influence due to uneven road surface vibration (negative influence on recognition that the vehicle V has deviated from its lane). As a result, it is possible to ensure that the driver is properly notified that the situation has occurred that the vehicle V deviates from the lane. Since the negative influence due to uneven road surface vibration can be reduced, it is possible to make the vibration pattern of the vibration device 34 contained in the wearable device 3 complex.

In other words, the vibration device 34 of the wearable device 3 vibrates with a specific vibration pattern according to the degree of deviation determined by the deviation degree determination unit 22 out of a plurality of types of vibration patterns according to the degrees of deviation from the lane (vibration patterns according to the vehicle traveling states of the first to fourth patterns described above), thereby making it possible for the driver to accurately recognize the degree of deviation. In addition, since the steering wheel need not contain the vibration device, there is no need to newly mount a vibration device in a steering wheel that does not contain a vibration device. This facilitates construction of the driver assistance system 1.

In addition, in the present embodiment, in the wearable device 3 that receives the vibration pattern information from the information transmission unit 24, the vibration device 34 vibrates in a pattern according to the degree of deviation from the lane according to the vibration pattern information. Therefore, in the wearable device 3, it is not necessary to store in advance information on a plurality of types of vibration patterns according to the degree of deviation from the lane, and the configuration of the wearable device 3 can be simplified and the load can be reduced.

In the present embodiment, a situation in which the vibration device 34 of the wearable device 3 is caused to vibrate can be set as desired. Therefore, it is possible to cause the vibration device 34 to vibrate even in a vehicle traveling state that was not notified in the related art that uses an alarm sound or vibration of the steering wheel.

Other Embodiments

It should be noted that the applicable embodiment is not limited to the above embodiment, and all modifications and applications included in the claims and the range equivalent to the claims can be applied.

For example, in the above embodiment, the wearable device 3 is a wristwatch type wearable device worn on the wrist of the driver. The applicable embodiment is not limited to this, and may be worn on a location other than the wrist.

In the above embodiment, the deviation degree determination unit 22 determines (determines) the four vehicle traveling states of the first to fourth patterns as situations in which the vehicle V deviates from the lane. The applicable embodiment is not limited to this, as long as the deviation degree determination unit 22 determines two or more vehicle traveling states.

Further, in the above embodiment, the vibration pattern information generation unit 23 provided in the driver assistance device 2 generates vibration pattern information according to the degree of deviation, and this vibration pattern information is transmitted to the wearable device 3. Was. The applicable embodiment is not limited to this, and the information transmitted from the driver assistance device 2 to the wearable device 3 may be only information relating to the degree of deviation, and the wearable device 3 may store information on a plurality of types of vibration patterns according to the information on the degree of deviation in advance, extract a vibration pattern according to the information on the degree of deviation from among the plurality of types of vibration patterns, and vibrate the vibration device 34 in this vibration pattern.

Further, in the above embodiment, the condition for implementing the driver assistance operation (implementation permitting condition) is that the LDA switch 6 is turned ON and that the driver assistance device 2 and the wearable device 3 are in a communicable state. The applicable embodiment is not limited to this, but in addition to these conditions, it is also possible to permit the execution of the driving support operation under the condition that the direction indicator device (so-called blinker device) of the vehicle V is not turned on, the emergency flashing indicator lamp (so-called hazard lamp) is not turned on, and that the driver is not in a situation where the driver intentionally causes the vehicle V to deviate from the lane.

The embodiment is applicable to a driver assistance device and a driver assistance system including the driver assistance device that can appropriately notify a driver of a deviation state from the lane.

What is claimed is:

1. A driver assistance device configured to notify a driver when a vehicle deviates from a lane where the vehicle is traveling, the driver assistance device comprising:
 a processor; and
 a memory storing instructions that are executable by the processor and cause the processor to
  acquire a degree of deviation of the vehicle from the lane,
  determine whether the acquired degree of deviation is classified into one of two or more predetermined patterns based on a relative position between the vehicle and the lane, and
  in response to the determination that the acquired degree of deviation is classified into one of the two or more predetermined patterns, send, to a wearable device worn by the driver of the vehicle, information for causing a vibration device contained in the wearable device to vibrate in a pattern according to the acquired degree of deviation;
 wherein the two or more predetermined patterns include:
  a first pattern where an outer edge of a tire of the vehicle is positioned inward from an inner edge of the lane in a width direction of the vehicle;
  a second pattern where the outer edge of the tire is positioned inward from a midpoint between the inner edge and an outer edge of the lane in the width direction;
  a third pattern where the outer edge of the tire is positioned outward from the midpoint of the lane in the width direction; and
  a fourth pattern where the outer edge of the tire is positioned outward from the outer edge of the lane in the width direction.

2. The driver assistance device according to claim 1, wherein the instructions cause the processor to
 generate vibration pattern information according to the acquired degree of deviation, and
 send the vibration pattern information to the wearable device as the information for causing the vibration device to vibrate in the pattern according to the acquired degree of deviation.

3. A driver assistance system comprising;
 a wearable device; and
 a driver assistance device configured to notify a driver when vehicle deviates from a lane where the vehicle is traveling, wherein
 the driver assistance device includes a first processor and a memory storing instructions that are executable by the first processor and cause the first processor to
 acquire a degree of deviation of the vehicle from the lane,
 determine whether the acquired degree of deviation is classified into one of two or more predetermined patterns based on a relative position between the vehicle and the lane, and
 in response to the determination that the acquired degree of deviation is classified into one of the two or more predetermined patterns, send, to the wearable device worn by the driver of the vehicle, information for causing a vibration device contained in the wearable device to vibrate in a pattern according to the acquired degree of deviation, and
 the wearable device includes the vibration device and a second processor configured to cause the vibration device to vibrate in the pattern according to the information received from the first processor;
 wherein the two or more predetermined patterns include:
  a first pattern where an outer edge of a tire of the vehicle is positioned inward from an inner edge of the lane in a width direction of the vehicle;
  a second pattern where the outer edge of the tire is positioned inward from a midpoint between the inner edge and an outer edge of the lane in the width direction;
  a third pattern where the outer edge of the tire is positioned outward from the midpoint of the lane in the width direction; and
  a fourth pattern where the outer edge of the tire is positioned outward from the outer edge of the lane in the width direction.

4. The driver assistance system according to claim 3, wherein
 the instructions cause the first processor to generate vibration pattern information according to the acquired degree of deviation, and
 the second processor is configured to cause the vibration device to vibrate in the pattern according to the vibration pattern information received from the first processor.

5. The driver assistance system according to claim 3, wherein the wearable device is a device worn on an arm of the driver.

6. The driver assistance system according to claim 3, wherein the instructions cause the first processor to send, to the wearable device, information for causing the vibration device to stop vibrating when the vehicle does not deviate from the lane.

7. The driver assistance system according to claim 3, wherein the instructions cause the first processor to acquire the degree of deviation from the lane under a condition that a lane departure alert switch provided in the vehicle is turned on and the first processor and the wearable device are in a communicable state.

8. The driver assistance system according to claim 7, wherein the instructions cause the first processor to acquire the degree of deviation from the lane under an additional condition that a direction indicator lamp and an emergency flashing indicator lamp of the vehicle are not turned on.

* * * * *